United States Patent [19]

Richardson et al.

[11] Patent Number: 5,126,886
[45] Date of Patent: Jun. 30, 1992

[54] SCROLLING PRIMARY COLOR CHANGER

[75] Inventors: Brian E. Richardson, San Jose; John R. Richardson, Los Gatos, both of Calif.

[73] Assignee: Morpheus Lights, Inc., San Jose, Calif.

[21] Appl. No.: 335,775

[22] Filed: Apr. 10, 1989

[51] Int. Cl.⁵ .......................... G02B 5/22; F21V 9/00
[52] U.S. Cl. ..................... 359/888; 359/889; 359/890; 362/283; 362/293
[58] Field of Search ........ 350/315, 318, 314, 311–313, 350/316; 362/283, 231, 277, 281, 268, 293

[56] References Cited

U.S. PATENT DOCUMENTS

| | | | |
|---|---|---|---|
| 2,416,919 | 3/1947 | Goldsmith | 350/314 |
| 3,237,513 | 3/1966 | Dreyfoos et al. | 88/24 |
| 3,260,152 | 7/1966 | Aston | 350/314 |
| 3,818,216 | 6/1974 | Larraburu | 362/268 |
| 4,294,524 | 10/1981 | Stolov | 350/333 |
| 4,459,014 | 7/1984 | Thebault | 350/315 |
| 4,535,394 | 8/1985 | Dugre | 362/231 |
| 4,600,976 | 7/1986 | Callahan | 362/277 |
| 4,602,321 | 7/1986 | Bornhorst | 362/268 |
| 4,697,227 | 9/1987 | Callahan | 362/233 |
| 4,745,531 | 5/1988 | Leclercq | 362/281 |
| 4,754,297 | 6/1988 | Edwards | 350/315 |
| 4,887,770 | 1/1990 | Solomon | 350/315 |
| 4,984,143 | 1/1991 | Richardson | 359/888 |

FOREIGN PATENT DOCUMENTS

| | | |
|---|---|---|
| 0352755 | 1/1990 | European Pat. Off. . |
| 8802996 | 6/1988 | Fed. Rep. of Germany . |
| 8801217 | 10/1988 | Fed. Rep. of Germany . |
| 2631684 | 11/1989 | France . |
| 629266 | 10/1949 | United Kingdom . |
| 2075698 | 11/1981 | United Kingdom ........ 350/313 |

Primary Examiner—Bruce Y. Arnold
Assistant Examiner—James Phan
Attorney, Agent, or Firm—Skjerven, Morrill, MacPherson, Franklin & Friel

[57] ABSTRACT

A color changer (20) comprising a component hue saturation filter (30) including an elongated flexible substrate (32) having a surface with a gradient axis (GA) and which includes a graded portion (G) supporting a uniform concentration of a selected hue filtering material (50) distributed in a continuously graded average density in beam-size areas around points along the gradient axis. The component hue saturation filters may be embodied in separate substrates positionable in parallel planes to be intersected serially by a beam of light. Alternately, dual-hue filters (68) may be formed by two primary hue component filters embodied in respective substrates each also embodying duplicate third primary hue component filters producing the same effects. Saturations of each selected hue of light appear evenly distributed in the output beam without the need for color components to be further commingled.

18 Claims, 6 Drawing Sheets

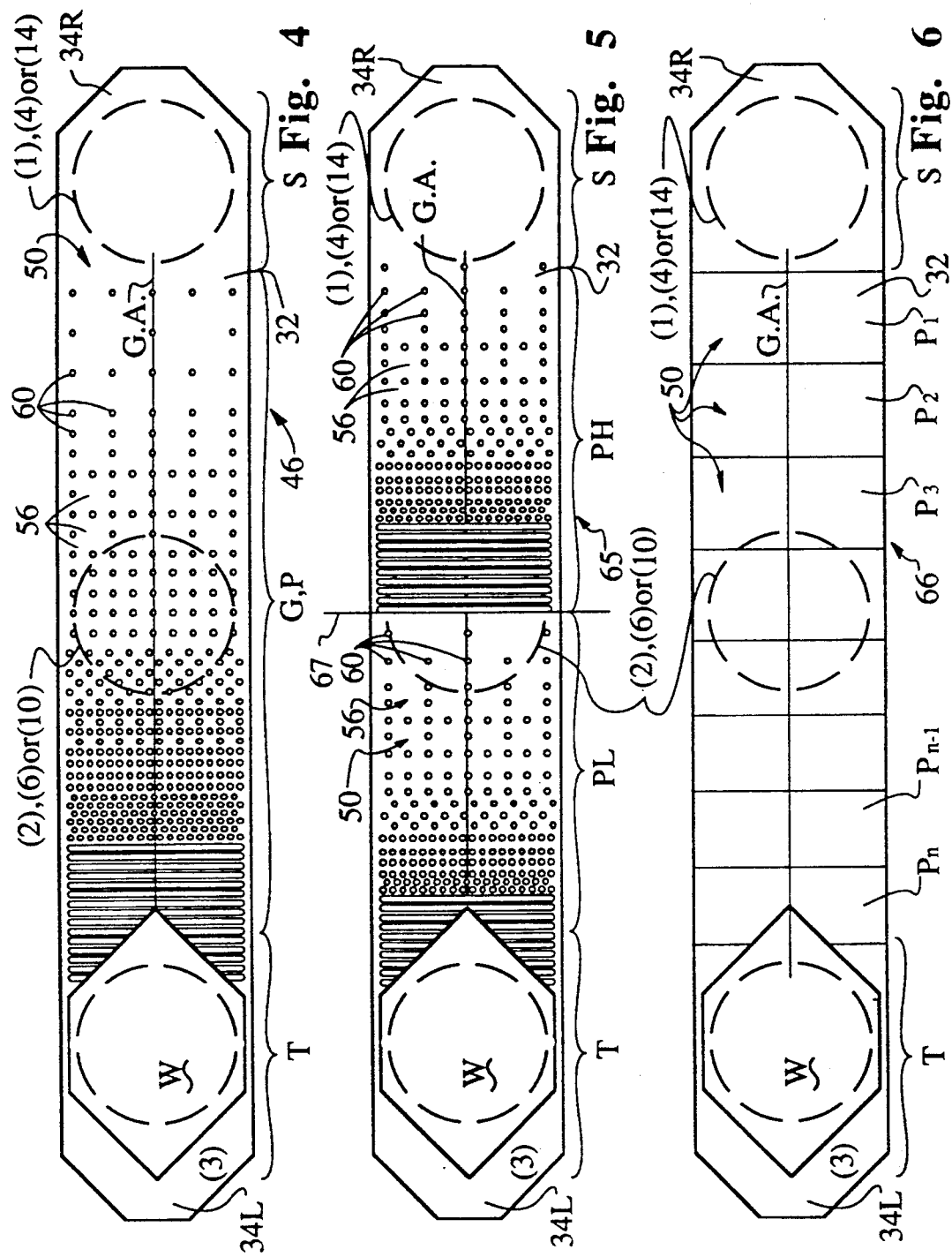

SCROLLING PRIMARY COLOR CHANGER

BACKGROUND OF THE INVENTION

1. Field of the Invention

The present invention relates generally to light filters, and more particularly to variable color filters used in spotlight projectors.

2. Discussion of the Prior Art

Theatrical productions make wide use of colored spotlight projectors. Such spotlights typically project beams of white light through filter substrates dyed with filtering media of selected color hues and saturations. Two or three different colors of light as components with proportioned brightnesses can be combined to yield intermediate hues and saturations of color.

U.S. Pat. No. 4,535,394 by Dugre can vary the color of light in a beam by adjusting the brightnesses of three individual sources of additive primary color component beams and then joining the component beams through a system of dichroic mirrors. U.S. Pat. No. 3,818,216 by Larraburu can vary the color of light in a beam formed by joining three additive primary color component beams whose intensities are adjusted with continuous gray-scale filters. The component beams are derived by splitting a beam of white light from a single source. U.S. Pat. No. 2,416,919 by Goldsmith for a television camera adjusts three component beam intensities with graded primary additive color filters.

In U.S. Pat. No. 4,294,524 by Stolov, contiguous pixel-like liquid crystal displays in sets of four repeated side-by-side are used as shutters to gate light rays filtered through respective contiguous thin strip filters corresponding to the three additive primary colors and grey in sets of four which filter white light projected from one source. Each set of four strip filters emits rays which, averaged together, can have a selected hue and saturation. The thin strip filter sets being repeated many times across the area of the projected beam lessens the need for different color components to be joined by mirror or lens means, but LCD shutter techniques have the drawback that a significant proportion of the white light penetrates "closed" LCD shutters, de-saturating the hue of the filtered light beam. Stolov also uses a diffuser to commingle the component beams.

U.S. Pat. Nos. 4,459,014 by Thebault, No. 4,600,976 by Callahan, and No. 4,745,531 by Leclercq describe variable color light projecting systems each using three color filter plates having solid areas of respective subtractive primary colors which are insertable one or more at a time to filter proportioned brightnesses of corresponding color components from white light in proportional sub-areas of a beam. However, the filtered areas of each hue and the remaining unfiltered areas of white light are unevenly distributed across the field of the downstream beam, and need to be commingled by an inefficient light-dispersing diffuser.

In U.S. Pat. No. 4,602,321 by Bornhorst, one source projects white light in a beam through dichroic filter elements in three ranks corresponding to respective subtractive primary colors. The filter elements in each rank are adjusted to an angle of incidence to filter their respective primary color in a uniform brightness distribution across the field of the beam. Inconveniently, however, such dichroic filters when adjusted to different angles of incidence do not filter all hues with consistent saturation ratios.

U.S. Pat. No. 3,260,152 by Aston enables color printers to balance print-developing light colors by using three continuous wedge filters of varying densities of respective primary subtractive hue dyes preferably formed on 35 mm film substrates. Aston focuses light through a small area of the film for approximately uniform density filtering. However, photographic film absorbs heat and could not, in small areas, filter the quantities of light required for stage lighting. Furthermore, photographic dye gradients are difficult to reproduce consistently as is required between possibly adjacent stage lights, and the photographic dye grading technique is not readily extendable to gelatin-type substrates. See U.S. Pat. No. 3,943,019 by Krekeler.

Conventional scrolling color changers shift across a light beam an elongated "gelstring" of frames of flexible transparencies ("gels," plastic or polyester) each dyed with a respective preselected hue and saturation of color. The "Panaspot" (tm) changer (by Morpheus Lights, Inc., San Jose, Calif.) uses multiple scrolls of frames, either alternately to facilitate accessing different color frames, or in combination to yield intermediate color hues and/or saturations.

Conventional scrolling color changers, however, can provide only a finite number, on the order of up to several dozen, predetermined color hues and/or saturations. Further, conventional scrolling color changers are obliged either to pass through any intervening color frames in accessing non-adjacent color frames, or else to black-out.

There is, therefore, a need for an improved and more efficient filter means for varying light color over a practically continuous range of selected color hues, saturations and/or brightnesses.

SUMMARY OF THE INVENTION

It is therefore a primary objective of the present invention to provide an improved color changer capable of filtering a beam of light to practically any desired color hue and/or saturation.

Another objective is to provide means for projecting a beam of light colored to practically any desired hue and saturation, with adjustable brightness.

A further objective is to provide a scrolling color changer capable of cross-fading along any selected path between any two selected hues and/or saturations of light color.

An additional objective is to provide a light projector capable of "bumping" from any saturated hue directly to unsaturated white or black and subsequently directly to any other hue.

A preferred embodiment of a color changer according to the present invention comprises a component hue saturation filter including an elongated flexible substrate having a surface with a gradient axis and which includes a saturate end portion supporting a selected hue filtering material distributed in a uniform concentration region adjacent one end of a gradient axis; a transparent end portion excluding the filtering material in a clear region adjacent the opposite end of the gradient axis; and, along the gradient axis between the end portions, a graded portion, preferably a patterned portion comprising a connected region-portion having multiple interstices occupied by a disjoint region-portion of discrete regions covering successively varying proportions of areas around successive points along the gradient axis, either one of the pattern portions supporting the uniform concentration of the selected hue filtering material so that the filtering material has a continuously graded average density in areas in the pattern.

The component hue saturation filters may be embodied in three separate substrates positionable in parallel planes to be intersected serially be a beam of light. Alternately, since usually only two primary hues are combined to produce any desired intermediate hue, two primary hue component filters may be embodied in first surface zones of a pair of substrates each also having a second surface zone duplicating a third primary hue component filter. The pair of dual-hue component saturation filters are capable of producing the same variable color effects.

The invention has the advantage that saturations of each selected hue of light appear evenly distributed in the output beam without the need for color components to be commingled by a diffuser or other complex beam-joining system.

These and further objectives and advantages of the present invention will become more apparent to those skilled in the art upon reading the following detailed description of the preferred embodiment as illustrated in the accompanying drawing.

BRIEF DESCRIPTION OF THE DRAWING

FIG. 4 is a component hue saturation filter means with an example pattern of filtering material;

FIG. 5 is a component hue saturation filter means with a second example pattern of filtering material;

FIG. 6 is a component hue saturation filter means with another example filtering material average density gradient;

DETAILED DESCRIPTION OF THE PREFERRED EMBODIMENTS

Figure 1:
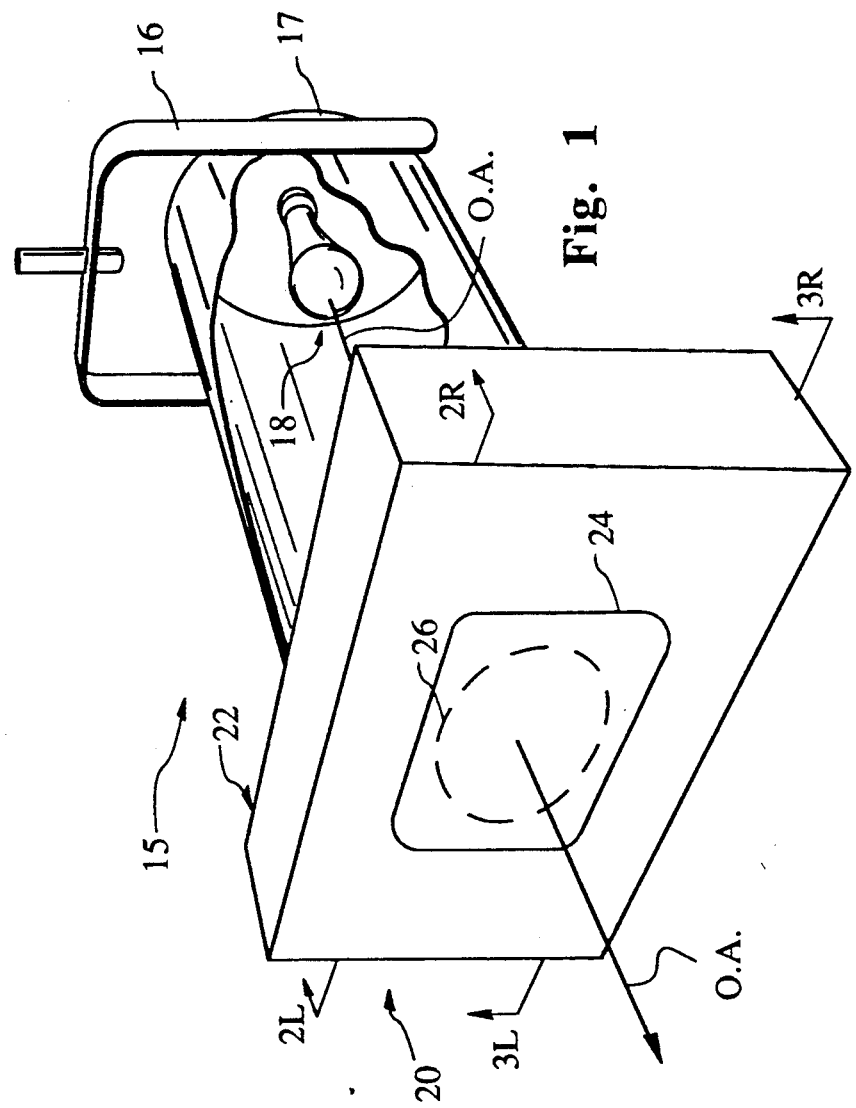
FIG. 1 is a perspective view of the exterior of a housing for a spotlight including a scrolling primary color changer according to the invention.

Color changers of the present invention in preferred embodiments are typically used in a spotlight projector 15 as shown in FIG. 1. When mounted on a suitable base (not shown), bracket 16 suspends casing 17 which encloses an adjustable intensity light source 18. When energized, source 18 projects broad-band (white) light along optical axis OA through color changer 20 housing 22 and out port 24 in a beam occupying circular area 26.

Figure 2:
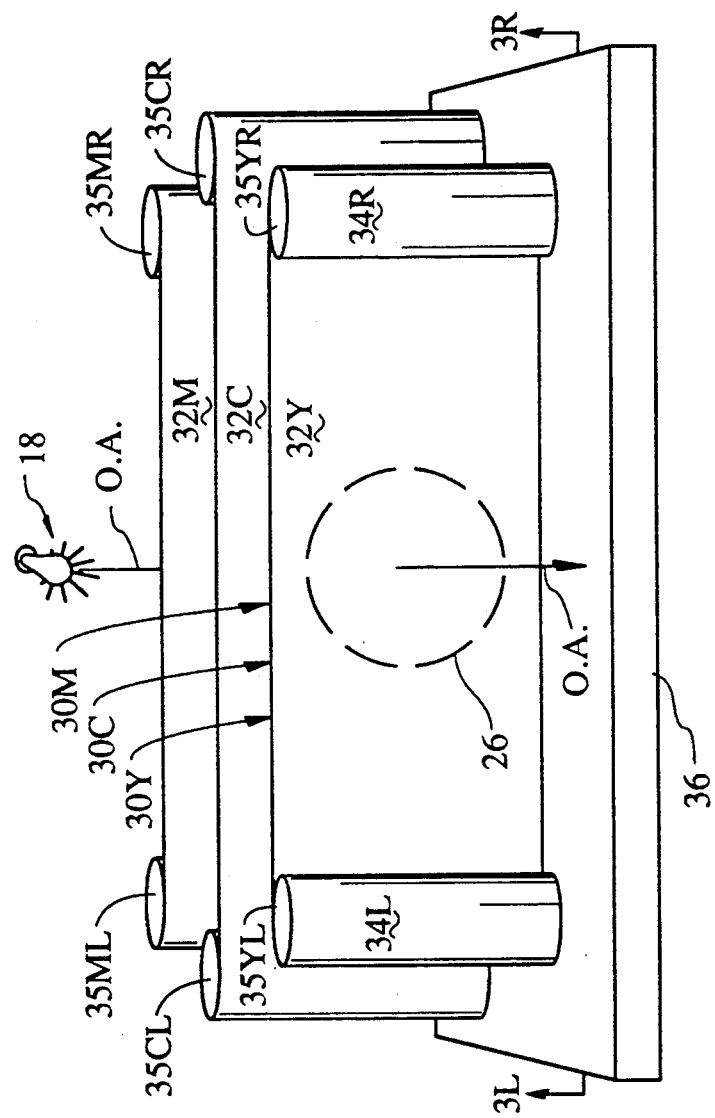
FIG. 2 is a view seen from FIG. 1 lines 2L-2R overlooking the housing interior and showing parts of three scrolls in a first embodiment of the color changer.

Inside housing 22, as shown in FIG. 2, a first embodiment of color changer 20 comprises for each of the selected (preferably the three primary subtractive, i.e., yellow, cyan and magenta) hues, a respective color component saturation filter such as 30Y, 30C or 30M. Each color component saturation filter 30 preferably comprises an elongated flexible substrate 32Y, 32C or 32M which has lengthwise opposite ends 34L and 34R wound scroll-like onto a respective pair of right and left spindles 35YL and 35YR, 35CL and 35CR, or 35ML and 35MR. Spindles 35 are typically journaled on bearings (not shown) in holes through color changer base plate 36.

Figure 3:
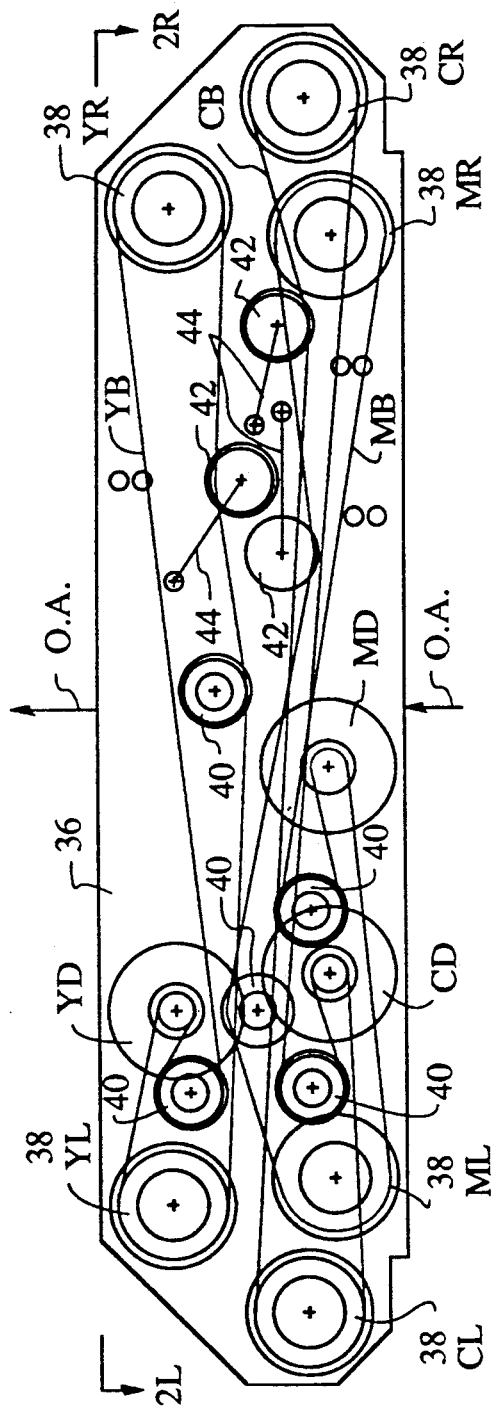
FIG. 3 is a view seen from FIG. 1 and FIG. 2 lines 3L-3R of the underside of the color changer showing three pulley-and-belt mechanisms for driving respective scrolls.

The pairs of spindles 35 end in pulleys 38YL and 38YR, 38CL and 38CR, or 38ML and 38MR beneath base plate 36 as shown in FIG. 3. Through pulleys 38, the pairs of spindles 35 are reversibly rotatable by corresponding drive mechanisms respectively including belts YB, CB and MB which are guided around idler wheels 40 held taut by rollers 42 on arms 44 loaded by springs (not shown), and which engage drive pulleys YD, CD or MD. The drive pulleys are controllably rotated by suitable motors, preferably DC servo motors or alternately stepper motors, not shown.

The component saturation filter scroll substrates 32 are independently translatable across light passing along optical axis OA in a beam in area 26. Scroll spindle 35 rotations are preferably monitored by digital encoders (not shown), or alternately by potentiometers, which feed angular position signals back to a suitable external control system (not shown) for activating the drive mechanisms and/or other possible functions of spotlight projector 15.

A component color saturation filter 30 preferably comprises an elongated (at least twice as long as its width, which is wider than the diameter of the beam 26 of light, for example 57 inches long by 8.5 inches wide by 3/1000 of an inch thick), flexible substrate 32 of, for example, polyester. Referring to FIG. 4, in a first embodiment 46 of a component filter 30 according to the present invention substrate 32 has, at right end 34R a "saturate" portion S supporting the selected hue filtering material 50, which may be a conventional "gel" type material, in a uniform concentration distribution region "(1) or (4)or (14)" at least as large as the light beam area 26.

Saturate portion S is adjacent a graded mid-portion G which begins at one end of a saturation gradient axis GA and which, in this first embodiment, is a patterned portion P with the same filtering material 50 concentration distributed uniformly in a connected region portion 56, except for not being distributed in a plurality of discrete regions 60 comprising a disjoint portion of patterned portion P. Discrete regions 60 occupy an essentially continuously graded proportion of, and exclude a graded average density of filtering material 50 from, successive beam-size areas such as area "(2) or (6) or (10)" around successive points along the length of gradient axis GA across patterned portion P.

Beyond the opposite end of gradient axis GA, substrate 32 left end 34L has a transparent portion T without hue filtering material (50) in a transparent region W which may be in the form of a clear tape window spliced onto, or a larger hole through, substrate 32.

FIG. 5 shows a component saturation filter 30 in a second embodiment 65 comprising successive pattern portions PH and PL, each resembling pattern portion P of component filter 46 as shown in FIG. 4, with the difference that pattern portion PH has a uniform heavy concentration of the selected hue filtering material 50 (except in discrete regions 60) and pattern portion PL has a uniform light concentration of the selected hue filtering material 50 (except in discrete regions 60). The heavy and light concentrations of filtering material 50 and the respective discrete region 60 densities in the two pattern portions are balanced to provide, across pattern portion inter-boundary 67, a continuous average filtering material 50 density distribution in areas (such as areas (2) or (6) or (14)) around successive points along gradient axis GA.

FIG. 6 shows a component saturation filter in a third embodiment 66 wherein, instead of color saturation being varied by the density of a pattern of filtering material, the graded portion comprises successive panel regions P1, P2, P3, . . . , Pn each having successively lighter uniform concentrations of the same selected hue filtering material 50.

Figure 7:
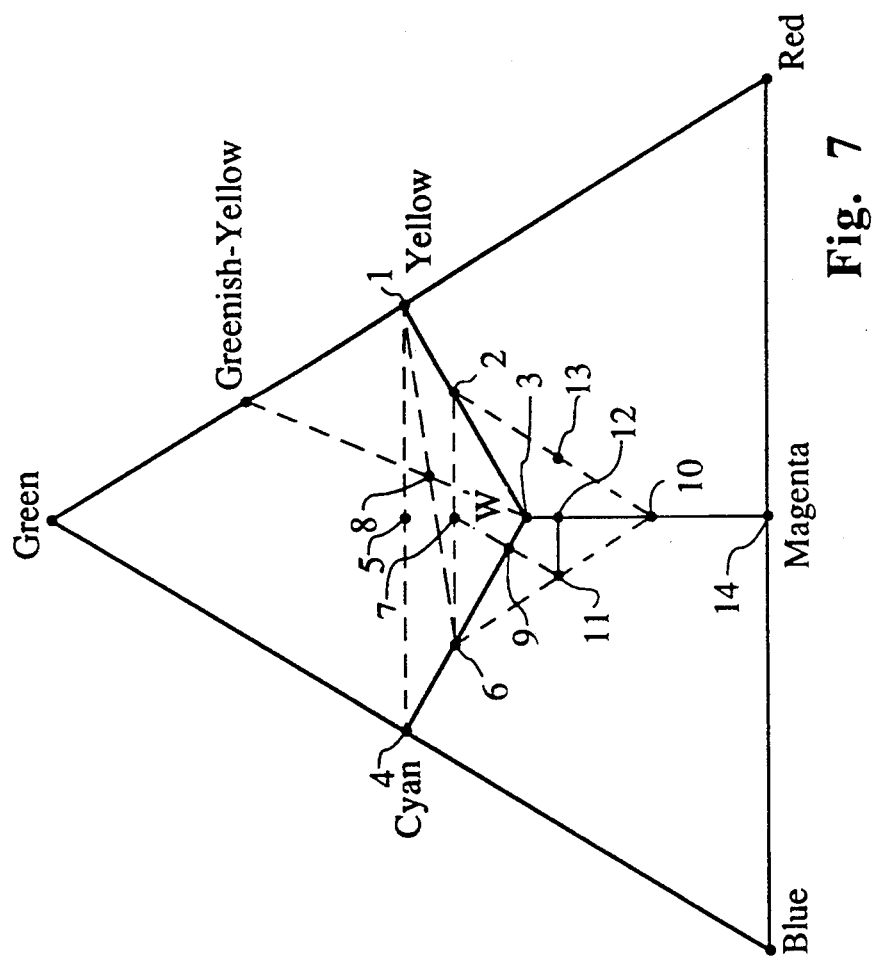
FIG. 7 is a color triangle.

FIG. 7 is a color triangle representing how, disregarding brightness, the average density gradient of a selected hue filtering material 50 starting from being uninterrupted at saturate portion S, through having a decreasing average density distribution across the graded portion G (either FIG. 4 pattern portion P or FIG. 5 pattern portions PH and PL or FIG. 6 graded portion panels P1 through Pn), to being eliminated at transparent portion T in the present invention corresponds to the color saturation gradient of filtered light starting from fully saturated at the corresponding point (1) or (4) or (14) of the selected hue on the FIG. 7 color triangle and de-saturating through pastels along a saturation gradient line to white light point W in the middle of the color triangle.

A component saturation filter 30 saturate portion S subtracts from white light the most rays of complementary hue components. When translated lengthwise along its gradient axis GA through its graded average density mid-portion, filter 30 will subtract declining proportions of rays of complementary hues. Translated beyond the gradient axis GA left end, the transparent portion T does not discriminately subtract rays of any component hue from the broadband (white) light source. During such a filter translation, while the color of the filtered light desaturates towards white, its initially selected component hue remains constant.

OPERATION

A suitable external control system (not shown) can be used to operate the drive mechanisms (not shown) independently, and preferably cooperatively, to translate the respective component filter scrolls 32Y, 32C and 32M in respective planes across a beam of light in order for selected areas of their surfaces to subtract respective complementary hues in proportions appropriate for the hue and saturation combination of a selected color. White light filtered through, for example, yellow hue component filter substrate 32Y saturate portion S with yellow filtering material in a uniform concentration distribution region (1) transmits light having a yellow saturation corresponding to point "1" on the color triangle of FIG. 7.

Repositioning filter substrate 32Y so that white light is filtered through graded portion P area (2) of medium average density yellow filtering material 50 transmits the same intensity of yellow rays and additionally transmits an increased proportion of the complementary (cyan and magenta, equivalent to blue) rays, which again combine as the same yellow hue but now with a decreased saturation corresponding to point "2" in the color triangle. Repositioning filter substrate 32Y so that white light passes through an area (3) of the transparent region W does not filter any hues differently and transmits unsaturated light corresponding to white light point "W."

From FIG. 7 point W, the light color can be gradually and selectively saturated towards any of the selected component hues by gradually translating the corresponding hue filter 30 so that increasing average density filtering material 50 areas subtract complementary rays proportionally from the beam. Starting from white light point W, translating across the beam for example the cyan filter 30C will transmit light increasingly saturated toward cyan, and ultimately, when interposing saturate cyan region (4), transmit a saturated color of light corresponding to point "4" on the color triangle.

Graded density filtering material 50 regions subtract proportional intensities of complementary hues as well when used together in series to intersect a beam of light. The component hue filters 30Y, 30C and 30M each limit the complementary hue intensities apparent in the filtered downstream beam. For example, using the saturate yellow hue filtering material region (1) for subtracting non-yellow rays in series with the saturate cyan hue filtering material region (4) for subtracting non-cyan rays, the two component filters 30Y and 30C together pass only light of the wavelengths common to both yellow and cyan, i.e., light at the intermediate green hue point "5" (with less brightness than light passing through a single component filter) in the color triangle. In light of this color, the green hue can be maintained constant while the saturation is decreased by coordinately translating the yellow and cyan filters 30Y and 30C by proportional distances along their respective gradient axes towards white point W. For example, the yellow filter 30Y patterned portion area (2) used in series with the cyan filter 30C patterned portion area (6) combine their component hue saturations at point "7" in the color triangle.

Other intermediate hues may be produced by using together proportional average density areas of two hues. For example, cyan filter 30C positioned at its medium average density point (6) used in series with yellow filter 30Y positioned at heavy average density point (1) combine along FIG. 7 line 6-1 and pass light the color of midpoint "8." A line extending from white light point W through point 8 to side R-G (Red-Green) of the color triangle indicates a greenish-yellow hue, which can likewise be maintained while the color saturation is varied by translating both the yellow and cyan filter substrates along their respective gradient axes cooperatively to keep their combined hue along line W-8.

According to the present invention, from any color point in the FIG. 7 color diagram, practically any transition or path can be traced out by appropriately translating the component hue saturation filters. Transitions between complementary hues pass most directly through white point W. Alternately, a given color saturation can be maintained while the hue is changed by oppositely changing the saturations of the component hues.

As an alternative to moving two component hue filters 30 to different average density areas, it is also possible, although not usually necessary, to move the third component hue filter to a different average density area to vary a given hue and/or saturation (which will further affect the overall brightness) of the beam.

Figure 8:
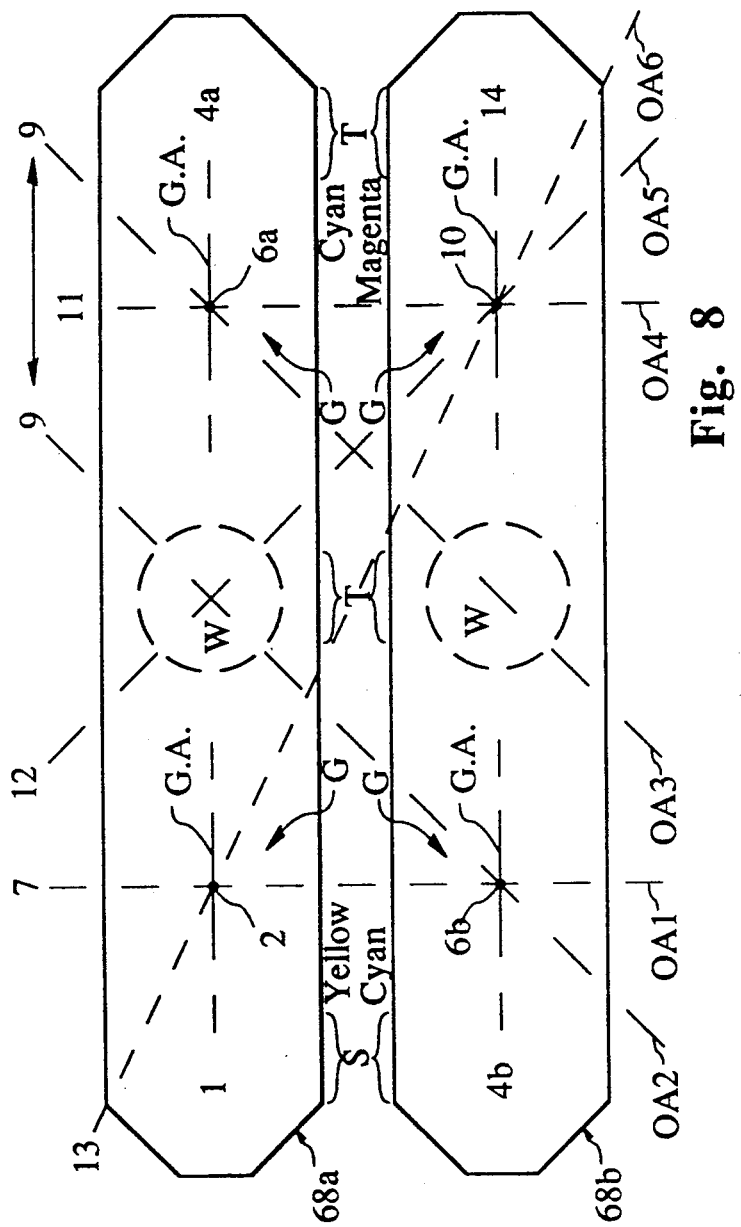
FIG. 8 is a pair of dual component hue saturation filters used in a second embodiment of a color changer according to the present invention.

FIG. 8 shows fourth embodiments of saturation filters in the form of dual hue component saturation filters 68a and 68b used in a second embodiment of a color changer (not shown, but like FIG. 2 and FIG. 3 changer 20 except with only two scroll drive mechanisms) according to the present invention. Each dual hue component saturation filter 68 comprises an elongated flexible substrate having two surface zones which each have a gradient axis and include a first end saturate portion having a respective subtractive primary hue filtering material distributed in a generally uniform concentration at a first end of the gradient axis; a second end transparent portion not having filtering material at a second end of the gradient axis; and a graded portion formed between the end portions having the hue filtering material in a uniform concentration distribution such that the filtering material has a graded average density in beam-size areas around successive points along the gradient axis in the graded portion. Each dual-hue component saturation filter has the two surface zones coupled at their second end portions. The two dual-hue component saturation filters each have one of their surface zones with a common color hue. Compared to the above-described first embodiment, a pair of dual-component saturation filters is able to filter light to the same hue and saturation points in the FIG. 7 color triangle. For example, color triangle point "7" can be produced by filtering white light along optical axis OA1 through yellow point 2 of dual component filter 68a in series with cyan point 6b of dual component filter 68b.

The FIG. 8 pair of dual hue component saturation filters is also able to perform transitions between any of the points in the FIG. 7 color triangle. Continuing with the example of the previous paragraph, while cyan-magenta filter 68b cyan zone point 6b stationarily intersects the beam of light, translating yellow-cyan filter 68a from point 2 to position point W to intersect optical axis OA2 filters through light having the color of point "9" on the cyan saturation gradient line W-4 in the FIG. 7 triangle.

This point "9" color saturation can be maintained by a dual component color changer while switching from having axis OA2 intersecting the (unsaturated yellow) white W portion of filter 68a to having axis OA3 intersecting the white (unsaturated magenta) portion of filter 68b. As moving filter 68b decreases the saturation of cyan, the saturation is concurrently compensated as filter 68a moves toward its cyan zone point 6a and increases the saturation toward cyan. Throughout the interval while filter 68b cyan zone point 6b is replaced by filter 68a cyan zone point 6a, the axis OA2-to-OA3 beam color hue and saturation combination remains at point "9" in the color triangle.

After switching the common cyan filters at point 9, then, with filter 68a point 6a providing the selected saturation of cyan, filter 68b is translated from white (FIG. 7) point W along increasing magenta saturation gradient line W-14 so that point "10" is intersected by the optical axis OA4. In this position, the two dual hue component saturation filters pass light having a hue and saturation combined along line 6-10 at point "11."

As with the first embodiment of the color changer, from point 11 a dual-component filter-pair color changer can make a transition to color point "12" by leaving magenta filter 68b at point 10b while translating yellow filter 68a to point W, which passes light along an optical axis OA5 having a combined color hue and saturation point 12. Continuing this translation of filter 68a so that light along an axis OA6 is intersected by yellow point 2 will pass light having a combined color hue and saturation point "13."

In transitions which do not both start and end with the common hue, it is not necessary to concurrently translate the dual component filters to substitute the common hue on one filter for that hue on the other filter.

In either the three-scroll or two-scroll color changer embodiment, output beam brightness is preferably controllable independently of hue and saturation by adjusting the source 18 light output. Beam brightness may be electrically dimmed to black, or alternately, the beam can be "bumped" quickly to black by moving all three filters' saturate regions (1) and (4) and (14) together to subtract rays of all hues of light.

During gradual dimming or slow fades, incandescent lamps 17 cool and shift their color towards red. This thermal color shift is significant and inconvenient for video cameras and has conventionally been contended with by using mechanical shutters. Thermal shift can be compensated for according to the present invention by computer-controlled positioning of a cyan hue gradient saturation filter across the dimming light.

Although the present invention is described above in terms of preferred embodiments, those skilled in the art will appreciate that the example embodiments might be modified without departing from the spirit of the present invention. Therefore, it is intended that the following claims be interpreted as covering any and all modifications falling within the true spirit and scope of the invention.

We claim:

1. Light filter means for selectively varying the color of light passing in a beam along an optical axis, comprising:
   three hue component saturation filter means including respective elongated flexible substrate means each having a surface which has a gradient axis and which includes
   a saturate end portion fixing a respective concentration region adjacent one end of said gradient axis;
   a transparent end portion excluding said filtering material in a region adjacent the opposite end of said gradient axis; and
   a graded portion formed between said end portions having said hue filtering material in a uniform concentration distribution such that said filtering material has a graded density in areas around successive points along said gradient axis in said graded average portion; and
   wherein said three substrate means are movable along their respective gradient axes to position selected average density filtering material areas to be serially intersected by a beam of light from which said component filters proportionally subtract respective complementary hues of light.

2. Light filter means as in claim 1 wherein said selected hues are the three subtractive primary hues.

3. Light filter means as in claim 2 wherein each said hue component saturation filter means comprises scroll means including a pair of spindles, and wherein each said flexible substrate is rollable across a beam of light passing between a respective pair of said spindles.

4. Light filter means as in claim 3 wherein said substrates are translatable in substantially parallel planes normal to said optical axis.

5. Light filter means as in claim 3 wherein said substrates comprise plastic.

6. Light filter means as in claim 3 wherein said filtering material comprises a dichroic coating.

7. Light filter means as in claim 3 wherein said filtering material comprises an organic dye.

8. Light filter means as in claim 3 wherein said filtering material is distributed in a said uniform concentration by printing on said surface.

9. Light filter means as in claim 3 wherein each said component saturation filter means comprises independently actuatable drive means for rotating said pair of spindles to translate said substrate means along its gradient axis in a respective plane to position a selected average density filtering material area to be intersected by light passing in a beam along said optical axis.

10. Light filter means as in claim 9 wherein each said drive means comprises a motor, pulleys and belts.

11. Light filter means as in claim 3 and further comprising a spotlight projector including a light source for projecting broadband light in a beam along said optical axis through said filter means.

12. A process of using a light filter means as recited in claim 1 to quickly black-out the color of a light beam projected through said light filter means be simultaneously translating all three component filter means for their saturate regions to intersect said light beam.

13. Light filter means for selectively varying the color of light passing in a beam along an optical axis, comprising:
three hue component saturation filter mans including respective elongated flexible substrate means each having a surface which has a gradient axis and includes
a first end saturate portion having a respective subtractive primary hue filtering material distributed in a generally uniform concentration at a first end of said gradient axis;
a second end transparent portion not having filtering material at a second end of said gradient axis; and
a graded portion formed between said end portions by a plurality of successive regions having said hue filtering material in respective successive uniform concentrations, such that said filtering material has a graded average density in beam-size areas around successive points along said gradient axis in said graded portion;
said three substrate means being movable in directions along their respective gradient axes to position selected density filtering material regions across said optical axis to be serially intersected by light in a beam from which each said component filter means filters corresponding proportions of respective complementary hues of light.

14. Light filter means as in claim 13 wherein said plurality of successive regions are uniform density panel regions.

15. Light filter means as in claim 14 wherein each said hue component saturation filter means comprises scroll means including a pair of spindles and independently actuatable drive means for rotating said pair of spindles to translate said substrate means along its gradient axis in a respective plane to position a selected average density filtering material area to be intersected by light passing in a beam along said optical axis between said pair of spindles.

16. Light filter means for selectively varying the color of light passing in a beam along an optical axis, comprising:
three hue component saturation filter means including respective flexible substrate means each having a surface which has a gradient axis and includes
a saturate first end portion having a respective substractive primary hue filtering material in a uniform concentration region adjacent a first end of said gradient axis;
a transparent second end portion not having filtering material in a region adjacent a second end of said gradient axis; and
a patterned portion connecting said end portions and comprising a connected region-portion having multiple interstices occupied by a disjoint region-portion of multiple discrete regions extending over gradually varying proportions of beam-size areas around successive points along said gradient axis, either one of said connected region-portion and said disjoint region-portion supporting said uniform concentration of the respective selected hue filtering material, whereby said filtering material has a graded average density in said successive beam-size areas between said end portions;
said three substrate means being concurrently movable in directions along their respective gradient axes to position selected average density filtering material areas across said optical axis to be serially intersected by light in a beam from which each said component filter means subtracts corresponding proportions of respectively complementary hues in order for said light filter means to combine proportioned saturations of the respective hues of light in the beam downstream.

17. Light filter means as in claim 16 wherein said connected region portion supports said respective hue filter material distributed in said uniform concentration.

18. Light filter means as in claim 16 wherein said discrete regions are holes through said substrate.

* * * * *